United States Patent [19]

Fletcher et al.

[11] 4,004,292
[45] Jan. 18, 1977

[54] SYSTEM FOR PRODUCING CHROMA SIGNALS

[76] Inventors: James C. Fletcher, Administrator of the National Aeronautics and Space Administration, with respect to an invention of Kenneth H. Vorhaben, Houston; Phillip C. Lipoma, Dickinson, both of Tex.

[22] Filed: Sept. 12, 1975

[21] Appl. No.: 612,967

[52] U.S. Cl. .................................................. 358/44
[51] Int. Cl.² ......................................... H04N 9/07
[58] Field of Search ................... 358/44, 45, 43, 30

[56] References Cited

UNITED STATES PATENTS

| | | | |
|---|---|---|---|
| 3,560,637 | 2/1971 | Takeuchi et al. | 358/44 |
| 3,647,948 | 3/1972 | Eto et al. | 358/44 X |
| 3,715,466 | 2/1973 | Karato | 358/45 |
| 3,921,206 | 11/1975 | Böhm et al. | 358/44 X |
| 3,935,588 | 1/1976 | Uno | 358/44 |

*Primary Examiner*—John C. Martin
*Assistant Examiner*—Mitchell Saffian
*Attorney, Agent, or Firm*—Marvin J. Marnock; John R. Manning; Marvin F. Matthews

[57] ABSTRACT

Disclosed is a method and system for obtaining electronic chroma signals with a single scanning-type image device by optically producing a color multiplexed light signal using an arrangement of dichroic filter stripes. In the particular embodiment described a two-layer filter system is used to color-modulate external light which is then detected by an image pickup tube. The resulting time division multiplexed electronic signal from the pickup tube is converted by a decoder into a green color signal, and a single red-blue multiplexed signal, which is demultiplexed to produce red and blue color signals. The three primary color signals are capable of being encoded as standard NTSC color signals.

6 Claims, 6 Drawing Figures

SYSTEM FOR PRODUCING CHROMA SIGNALS

ORIGIN OF THE INVENTION

The invention described herein was made in performance of work under a NASA contract and is subject to the provisions of Section 305 of the National Aeronautics and Space Act of 1958, Public Law 85–568 (72 Stat. 435; 45 U.S.C. 2457).

BACKGROUND OF THE INVENTION

1. Field of the Invention

The present invention pertains to the production of chroma signals from a single image-detecting device. In particular, the present invention relates to the use of dichroic filter stripes to optically color multiplex light from a scene, with the filter stripes oriented perpendicular to the scan lines of an image tube. The image tube then converts the optically multiplexed light signal into a time division multiplexed electronic signal which may be decoded into individual color signals. Standard National Television Standards Committee (NTSC) color signals may be obtained when the optical color multiplexing is achieved by selective use of red and blue dichroic filtering.

2. Description of Prior Art

The production of multiple electronic color signals by a signal television image tube is well known in the art as an advance beyond the use of three image tubes with each image tube producing a single color signal. A basic feature of color television communication is the optical separation of light from the scene to be televised into three distinguishable color light signals. Each light signal comprises information to produce an image of the scene, but only in the particular color frequency range selected for that particular light signal and, therefore, only to the extent that the original light from the scene included light in that frequency range. Usually, the three primary colors, red, blue, and green, are chosen for the three color light signals.

In a three-tube system, each light signal is converted into an electronic signal which, after transmission, is fed to a picture tube to produce a one-color image of the original scene. The three one-color images are optically combined to produce a true color image of the original scene. The system developed by the National Television Standards Committee (NTSC) uses an encoder to convert the three primary color electronic signals into a luminance signal, which encompasses brightness information, and a chrominance signal, which comprises hue and saturation information. The luminance and chrominance signals are transmitted as a composite wave, and decoded at the receiver in terms of the primary colors to produce a true color picture on a single picture tube. To utilize the NTSC transmission system, a single pickup tube system must produce three primary color electronic signals.

Various techniques using striped filter arrangements and dichroic mirrors have been developed for producing three primary color electronic signals from a single television image tube. These techniques take advantage of the fact that a television image tube is a scanning-type detector which temporarily records the image of a scene projected on its photosensitive surface and constructs an electronic signal by methodically scanning the image point by point along a grid composed of parallel scan lines. The resulting electronic signal carries the image information as a function of time. The filter and/or mirror arrangements are used to produce the necessary three light signals in different colors, which are then superimposed on the photosensitive surface of the image tube according to some selected scheme which permits the three images to be distinguished and allows three separate color signals to be retrieved from a single electronic output signal from the image tube. Thus, these single image tube techniques are identifiable according to the scheme by which the three color signals may be distinguished and retrieved.

In each of these single image tube techniques, the striped filter or mirror arrangement acts on the light from the scene to be televised in such a way as to project each of the three color light signals onto the photosensitive surface of the image tube in a periodic pattern. The patterns are usually in the form of stripes oriented at some non-zero angle with respect to the orientation of the image tube scan lines. The stripe patterns of the different color light signals may be mutually parallel or not, depending upon the particular technique employed. Then, in the scanning process, the image tube detects each of the three light signals as a separate, periodic pattern of light intensities, with the three periodic patterns spatially interleaved on the photosensitive surface. The output electronic signal from the image tube thus contains the information from the three separate color light signals interleaved in time; that is, the image tube output signal is a composite of three electronic signals, whose individual wave characteristics, such as amplitude, modulation, and frequency, are determined by the optical intensity, spatial modulation, and period of the corresponding color light pattern on the photosensitive surface of the image tube. When the striped filter arrangement is so constructed that the three color light signals incident on the photosensitive surface of the image tube differ among themselves in period, the information from the three light signals is carried in the output electronic signal from the image tube in three frequency ranges. As a result, three electronic color signals may be recovered from the single output signal from the image tube by appropriate use of low-pass and band-pass filters. Examples of such frequency division multiplex systems may be found in U.S. Pat. Nos. 2,733,291 and 3,530,233. U.S. Pat. Nos. 3,524,014; 3,647,946 and 3,780,212 disclose phase division multiplex systems. In such systems, the three color light signals are projected onto the photosensitive surface of the image tube in such a way that the scanning process detects the three light signals as having the same frequency, but differing in phase. The single output signal from the image tube is then phase demodulated to recover three electronic color signals.

Both the frequency division multiplex and the phase division multiplex systems require very close tolerances in the electronic circuitry and in the image tube in order to avoid undesirable distortion. One source of distortion is imprecision in the scanning which is inherent to some degree in virtually every image pickup tube. Such scanning defects include the scanning beam being out of place at a particular time of the scanning process, and variation in scan velocity. These defects result in distortions in the shape of the image as ultimately produced at the receiver, whether the television system is color or black and white. However, in the case of color systems employing frequency division multiplexing or phase division multiplexing, a variation in the scanning velocity causes an apparent change in the frequencies and phases of the color light signals projected onto the image tube. Consequently, in these color systems, color distortion as well as shape, or geometric, distortion appears in the image at the receiving picture tube. Finally, the band-pass filters employed in these types of color systems are very sensitive to signal frequency, and are therefore additional potential sources of color distortion. It will be appreciated that, while a certain degree of color distortion may be tolerated in many applications, such distortions become prohibitive in some technical applications, particularly where colorimetry is important. It is an advantage, therefore, to employ a color system which does not require extremely close tolerances in the related circuitry, and which effectively eliminates the deterioration of color fidelity caused by imperfect scanning.

SUMMARY OF THE INVENTION

The method of the present invention comprises optical spatial color multliplexing of light from a scene to be detected. The multiplexing of the incident light is effected in the form of a pattern of parallel stripes arranged perpendicular to the direction of propagation of the light beam. The multiplexed light beam is thus a composite of interleaved individual color light signals, each encompassing information from the original scene to be detected. The multiplexed color light signals are projected onto a scanning-type image device in such a manner that each scan line of the image device is exposed to all of the multiplexed color light signals. The scanning image detector device then reads, or detects, the multiplexed color light signals, and produces an electronic signal containing, in time sequence, readings from all of the individual color light signals as detected according to the scanning scheme. The image device thus converts the optically spatially color multiplexed light signals into an electronic time division multiplexed signal. The output signal from the image device may then be electronically decoded, with individual electronic color signals distinguished and retrieved from the time division multiplexed signal.

Apparatus used to effect the present invention includes an optical filter system comprising two filter layers, with each layer composed of transparent stripes alternating with dichroic filter stripes. The dichroic filter stripes on one layer remove one primary color from the incident light beam, say, blue, while the dichroic filter stripes on the other filter layer remove another primary color, say, red. The filter stripes on both filter layers are so proportioned and so positioned that the combination of the two filter layers, when acting on light incident upon the combination, modulates the light beam into a light signal multiplexed in color stripes, periodic perpendicular to the direction of propagation of the light, in the sequence: green and red, green, green and blue, green. The optically multiplexed light beam is incident on the photosensitive surface of a television image pickup tube, such as a vidicon, which scans the image and converts the multiplexed color light signals into a single electronic output signal. The output signal from the image tube is time division multiplexed in the same sequence by which the input light signal is optically multiplexed: green and red, green, green and blue, green. Time delay and subtractor circuits are employed to obtain a single blue-and-red multiplexed signal, which is then time division demultiplexed to obtain separate red and blue color signals. A green color signal is obtained by one of several methods.

Any geometric distortion that is introduced into the time division multiplexed output signal from the image pickup tube by scanning defects of the image tube will be present in both the direct readout of the output signal as well as in the time delayed readout of the output signal. Consequently, when the difference signal is obtained by the subtractor circuit, there will be no color distortions as a result of the geometric distortion due to imperfect scanning. Furthermore, the decoder circuitry utilized with the present invention to retrieve the color signals from the single output signal of the image pickup tube does not include band-pass filters. Therefore, the method and apparatus of the present invention produce three color signals, capable of being encoded according to the NTSC system, without the presence of undesirable color distortion to which previous single image tube systems are susceptible. It will also be appreciated that the use of a single carrier frequency for the red and blue color signals in the present invention, rather than two separate carrier frequencies for color signals in addition to the luminance signal required in previous systems, permits the use of a smaller overall system bandwith.

DESCRIPTION OF THE PREFERRED EMBODIMENT

Figure 1:
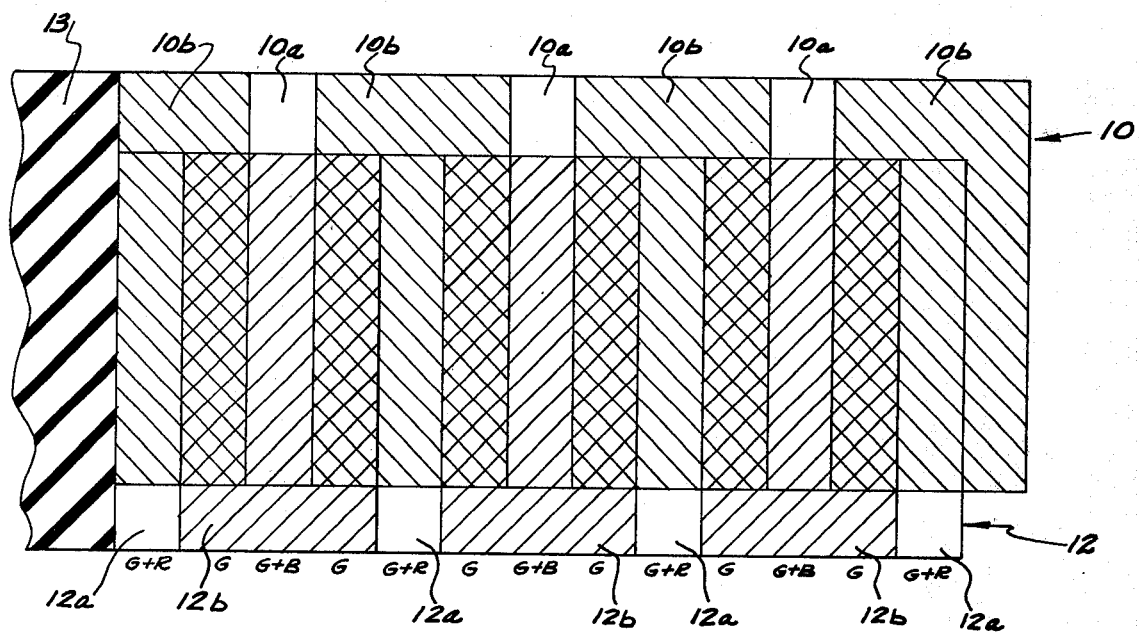
FIG. 1 is an end view of a portion of the dichroic filter combination used in the present invention.

FIG. 1 illustrates the filter combination employed in the present invention. The filter combination is composed generally of two layers, 10 and 12. Filter layer 10 is made up of a periodic array of optically transparent stripes 10a alternating with blue dichroic filter stripes 10b. Similarly, filter layer 12 is made up of a periodic array of optically transparent stripes 12a alternating with red dichroic filter stripes 12b. The blue dichroic filter stripes 10b are opaque to blue light, while the red dichroic filter stripes 12b are opaque to red light. The transparent stripes 10a and 12a of the two filter layers 10 and 12 respectively are all of the same width, while the dichroic filter stripes 10b and 12b are also all of equal width, with the dichroic filter stripes being three times as wide as the transparent filter stripes. The two filter layers 10 and 12 are oriented with respect to each other so that all of the filter stripes on both filter layers are mutually parallel, and the two filters layers are positioned with respect to each other so that the transparent stripes 10a of the filter layer 10 are centered directly opposite the dichroic filter stripes 12b of the filter layer 12. The transparent stripes 12a of the filter layer 12 will then necessarily be centered directly opposite the dichroic filter stripes 10b of the filter layer 10. An opaque mask, 13, is deposited on each filter layer along one side so that an opaque edge is parallel to the filter stripes. Thus, the combination of the two filter layers 10 and 12 provides an array of striped filters of equal width, periodically opaque to light colors in the following sequence as observed from the opaque mask edge: blue, red and blue, red, red and blue. In terms of the primary colors green, red, and blue, the combination of filter layers 10 and 12 is therefore transparent in periodic stripes in the corresponding sequence: green and red, green, green and blue, green—as indicated by the letter sequence G + R, G, G + B, G below the corresponding stripes in the combination in FIG. 1.

The filter layers 10 and 12 shown in FIG. 1 represent generally only small segments of actual filter layers used in the invention. In practice, the lateral dimensions of the filter layers 10 and 12 may be on the order of a few centimeters, with a filter stripe density ranging from about 100 to 1,000 stripes per centimeter. The dimensions of the filter layers 10 and 12 as well as the filter stripe density in any given case are dependent upon the size of the image and the optics used, as well as the desired resolution of the system. Such filter layers as those shown at 10 and 12 may be readily constructed, for example, by depositing appropriate dichroic material in stripes on a transparent substrate.

Figure 2:
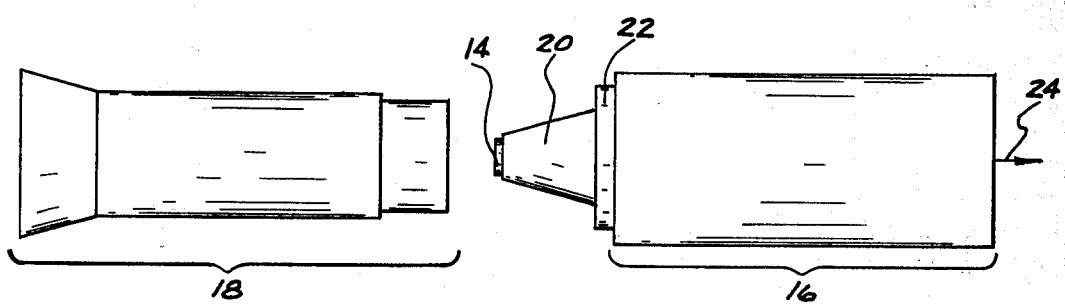
FIG. 2 is a schematic elevation showing an application of the filter combination of FIG. 1 to a television camera system.

In FIG. 2, the filter combination 14, composed of the filter layers 10 and 12 represented in FIG. 1, is shown positioned in a television camera system. The image pickup tube is shown generally at 16, and may be, for example, a vidicon or other suitable television image tube. Optics, including possibly a zoom lens, appropriate for projecting light from the scene to be televised (not shown) onto the pickup tube at 16, are shown generally at 18. Light from the scene, which would be to the left in FIG. 2, passes through the optics at 18 and the filter combination 14 which lies in the image plane of the optics 18. A fiber optics taper faceplate 20 expands the light signals emerging from the filter combination 14. The light signals are then enhanced by an intensifier 22 before proceeding on to the photosensitive surface (not visible) of the pickup tube at 16. Details of a typical television image pickup tube such as that at 16 are well known in the art and are not specified herein.

The particular camera arrangement shown in FIG. 2 is not to be considered as a limitation on the present invention, but is simply shown as an example of how the present invention may be employed in a given case. The optics at 18, the taper faceplate 20 and the intensifier 22 may all be removed or replaced by other optical devices. In particular, the combination of filters 14 may be placed directly onto the faceplate of the image pickup tube at 16. Furthermore, the present invention does not preclude the use of additional optical instrumentation including filters or other optical modulating devices in addition to the type of filters present in the combination 14 for a particular application.

The filter combination 14 is rotationally oriented with respect to the axis of the camera system shown in FIG. 2 so that the filter stripes of the filter layers 10 and 12 are prependicular to the scan lines of the image pickup tube at 16. The spatially modulated image that appears on the photosensitive surface of the image tube at 16 is then read by the image tube and converted into an electronic signal which is output from the image tube as indicated at 24. The output electronic signal indicated at 24 carries, in time sequence, readings made point by point across each scan line, with each scan line read in sequence from top to bottom on the photosensitive surface of the image tube 16 to transmit a single picture; successive pictures are scanned in like manner, with the readings transmitted in time sequence as part of the output signal 24. Thus, the image pickup tube at 16 converts the optically color multiplexed light signals as projected onto its photosensitive surface by the filter combination 14 into an electronic time division multiplexed signal outputted at 24. Whereas the optically multiplexed light signals contain color information from the scene to be televised in the form of parallel stripes arranged perpendicular to the direction of propagation of the light beam which falls on the photosensitive surface of the image pickup tube at 16, the output electronic signal indicated at 24 contains the color information from the scene to be televised in the form of a sequence of electronic readings of small segments, or elements, of the image projected onto the photosensitive surface of the image tube. Since the image projected onto the photosensitive surface of the image tube at 16 by the filter combination 14 is arranged in the color sequence: green and red, green, green and blue, green, as described hereinbefore, the scanning beam of the image tube, moving along a scan line perpendicular to the orientation direction of the optical filter stripes, reads the image segments on the photosensitive surface in the same color sequence. Consequently, the color information readings transmitted as the electronic output signal indicated at 24 are arranged periodically in the same sequence. Hence, the output electronic signal indicated at 24 is time division color multiplexed while the light signal input to the image tube at 16 is spatially color multliplexed by the filter combination 14.

Figure 3:
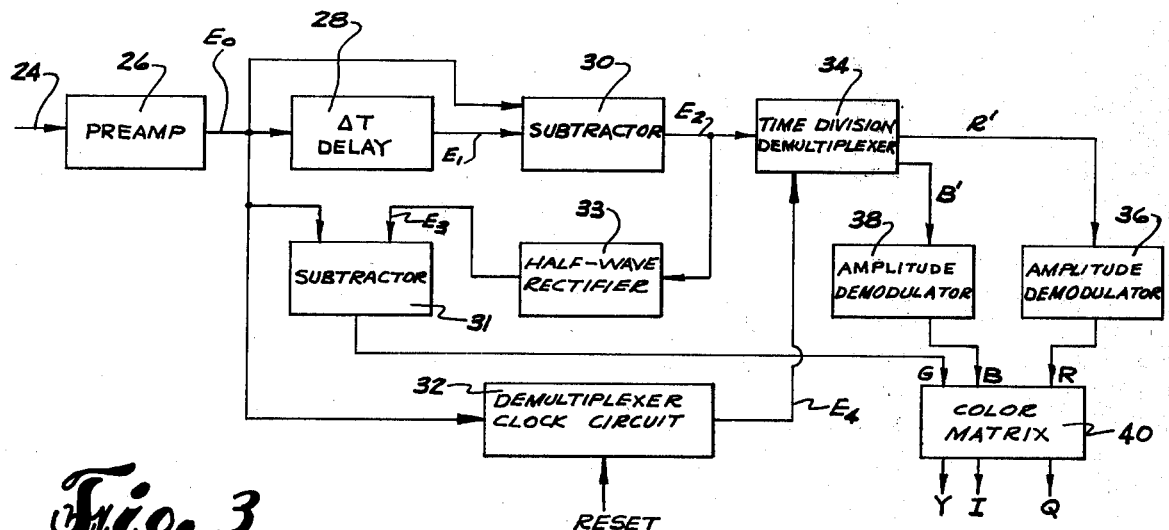
FIG. 3 is a block diagram of a decoder used to convert the single output signal from the image pickup tube of the present invention into separate color signals.
Figure 4:
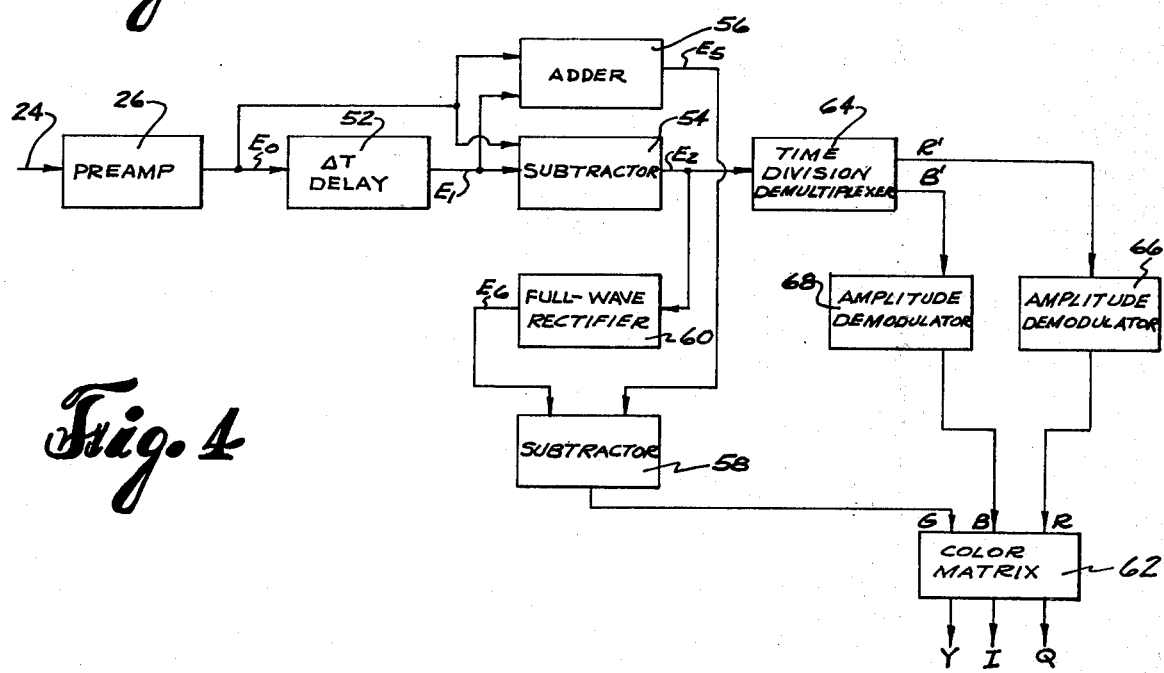
FIG. 4 is a block diagram of an alternate decoder circuit.

FIG. 3 illustrates a type of decoder which may be employed to separate individual color light signals from the output electronic signal at 24 of the image pickup tube at 16 in FIG. 2. FIG. 4 illustrates an alternate method for decoding the color signals. As in the case of the camera system shown generally in FIG. 2, the decoders shown in FIGS. 3 and 4 are offered as but two methods of obtaining color signals capable of being used in the NTSC television system, and are not particular limitations on the present invention.

The output electronic signal from the image tube at 16 is indicated at 24 in FIG. 3 being amplified by the preamp 26. The amplified output signal from the preamp 26 is identified as $E_o$. The signal $E_o$ is fed to four separate processing circuits: a time delay circuit 28; two subtractor circuits 30 and 31; and a demultiplexer clock circuit 32. The signal output from the time delay circuit 28 is indicated as $E_1$, and is also fed into the subtractor circuit 30. The output signal from the subtractor circuit 30, $E_2$, is then fed to a half-wave rectifier circuit 33, which produces an output signal $E_3$, and a time division demultiplexer 34, which produces two signals, one, R', fed to an amplitude demodulator 36 from which is obtained the red color signal, indicated as R, and the other, B', fed to an amplitude demodulator 38 from which is obtained the blue color signal, B. A green color signal, G, is obtained by feeding the output signal $E_3$ from the half-wave rectifier circuit 33 and the output signal $E_o$ from the preamp 26 to the subtractor circuit 31. The red R, blue B, and green G color signals are fed to a conventional linear color matrix 40 which outputs a luminance signal Y and color difference signals I and Q well known in the art.

Figure 5:
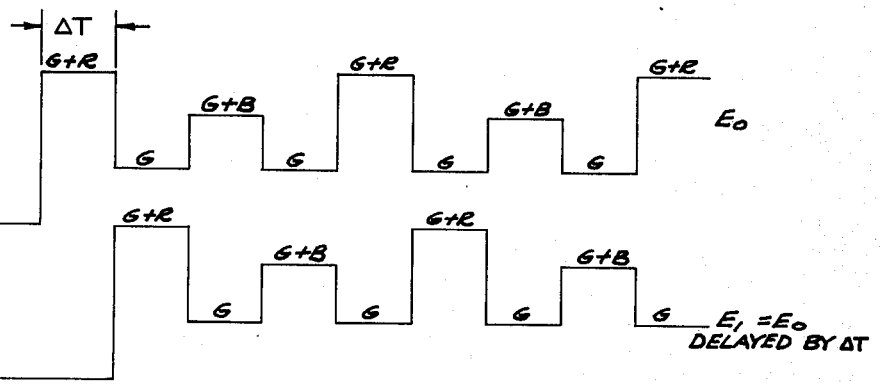
FIG. 5 is a diagram of wave forms present at various stages in the decoders shown in FIGS. 3 and 4.
Figure 5:
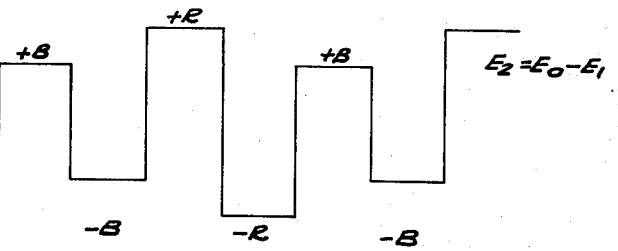
Figure 5:
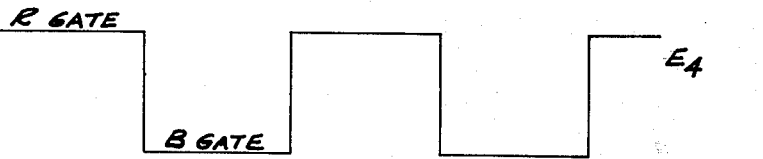

Details of the operation of the decoding circuitry shown in FIG. 3 may be appreciated by reference to FIG. 5 which illustrates wave forms for the signals $E_o$, $E_1$, $E_2$ and $E_3$ as previously discussed. The output signal from the preamp 26, $E_o$, is an amplified version of the output signal 24 from the image pickup tube at 16 in FIG. 2. The time division color multiplexing of the signal $E_o$ is illustrated in FIG. 5. Green color information is present at all times in the signal $E_o$. The time $\Delta T$, which is the time required for the transmission of a single color segment readout from the image pickup tube at 16, is determined by the geometry of the image projected onto the photosensitive surface of the image tube as well as the scanning velocity of the electron beam of the image tube. The ratio of the time period $\Delta T$ to the time required for the image tube to scan one scan line is equal to the ratio of the width of the filter stripes of the filter combination 14, as projected onto the photosensitive surface of the image tube 16, divided by the total width of the image on the photosensitive surface that is scanned by the electron beam. Where the filter combination at 14 is applied directly to the faceplate of the image tube at 16, the actual width of the filter stripes is the same as the stripe width projected onto the photosensitive surface.

The time delay circuit 28 produces an output signal $E_1$ which is identical to the signal $E_o$ but delayed by a time $\Delta T$ as indicated in FIG. 5. When the two electronic signals $E_o$ and $E_1$ are fed into the subtractor circuit 30, the difference signal $E_2$ shown in FIG. 5 is produced. The difference signal $E_2$ is a red-and-blue time division multiplexed amplitude modulated carrier signal. The time division demultiplexer 34 separates the red and blue signals, thereby producing two carrier signals, R' and B', from the original single input chroma carrier signal $E_2$. It is necessary to sync the time division demultiplexer 34 with the scanning of the spatially modulated light signals by the image tube at 16. The red carrier signal R' is demodulated by the amplitude demodulator 36 to obtain the red color signal R; similarly, the blue color signal B is obtained from the blue carrier signal B' by the amplitude demodulator 38.

The green color signal is obtained by feeding the output of subtractor 30, waveform $E_2$ shown in FIG. 5, to the half-wave rectifier circuit 33, which produces the waveform $E_3$ shown in FIG. 5. This signal $E_3$ is then fed to one input of the subtractor circuit 31. The signal $E_o$ is fed to the other input of the subtractor circuit 31 which produces the green color signal G.

Figure 6:
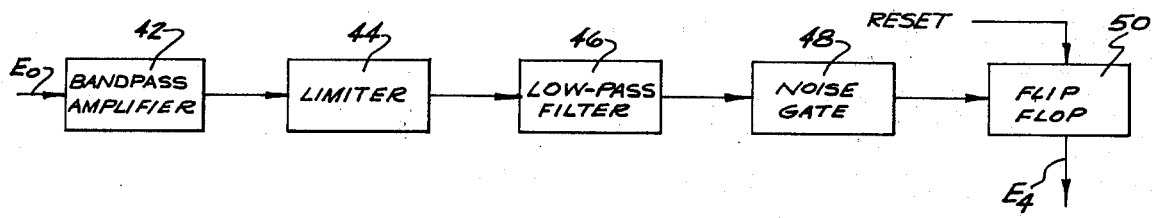
FIG. 6 is a block diagram of a demultiplexer clock circuit used to produce the clock signal necessary for demultiplexing the red and blue color signals.

In order to correctly demultiplex the red and blue multiplexed signal $E_2$, it is necessary to provide a clock which is synchronized and in phase with the scanning beam as it reads the color encoded picture signal from the signal plate of the image sensor 16 in FIG. 2. The demultiplexer clock circuit 32 in FIG. 3 performs this function. The details of one such type of clock circuit 32 are shown in FIG. 6. As the scanning beam traverses over the opaque mask 13, shown in FIG. 1, only dark current will be received by the preamp 26. A positive transistion will occur as the beam traverses from the opaque mask 13 to the first color filter stripes, which produces a green-and-red signal. Positive transistions will occur as the beam traverses from a green to a minus blue filter stripe or from a green to a minus red filter stripe. The signal $E_o$ from the preamp 26 is processed by a band-pass amplifier 42, a limiter 44, a low-pass filter 46 and a noise gate 48 in order to produce an amplified signal of the positive transistions with a very high signal-to-noise ratio. Each positive transistion toggles a flip flop circuit 50 to produce the demultiplexer clock signal $E_4$ shown in FIG. 5. The flip flop circuit 50 is reset during the image sensor blanking period and is therefore in the same logic state at the beginning of each horizontal line scan of the scanning beam. The clock signal $E_4$ is in phase and synchronized with the red and blue multiplex signal $E_2$. This is necessary in order to demultiplex the red-blue multiplexed signal $E_2$ correctly in the time division demultiplexer circuit 34.

Even with the absence of red and blue scene content, a small positive transistion will occur as the beam scans from the green filter stripe to the minus blue filter stripe and from the green to the minus red. This small signal occurs because the color filter bandwidth is wider for the minus red and minus blue filter stripes than for the green stripe and therefore a slightly higher green signal will be produced by the scanning beam. The processing circuitry shown in FIG. 6 must amplify this small signal so that the positive transition can be cleanly detected in order to toggle the flip flop circuit 50.

The noise gate 48 is a comparator with hysteresis so that once the signal has reached a certain threshold level the comparator will detect this condition and change states. Once the comparator output has changed states the hysteresis lowers the threshold level so that the signal must fall below this lower level before the comparator will switch back to its original state.

It is also possible to obtain the demultiplexer clock signal $E_4$ by utilizing a phase-locked loop circuit to phase and synchronize an oscillator to the signal $E_o$ received from the preamp 26.

There are other methods for obtaining the green color signal. One alternate method is shown in FIG. 4. The output from the preamp 26, signal $E_o$, is delayed by a time delay circuit 52 to produce the signal $E_1$ as shown in FIG. 5. The signals $E_o$ and $E_1$ are fed to a subtractor 54 to produce $E_2$ as previously described, and are also fed to an adder, 56, to produce the waveform $E_5$ as shown in FIG. 5. The signal $E_5$ is fed to one input of a subtractor circuit 58. The output of the subtractor circuit 54 is fed to a precision full-wave rectifier 60 to produce a waveform $E_6$ shown in FIG. 5, which is fed to the other input of the subtractor circuit 58. The output of the subtractor circuit 58 produces the green color signal G which is fed to a color matrix 62. As in the decoder circuit shown in FIG. 3, the output signal $E_2$ from the subtractor circuit 54 is a red-and-blue time division multiplexed signal which is fed to a time division demultiplexer circuit 64, synced to scanning beam reading of the signal plate of the image sensor 16 in FIG. 2 by a demultiplexer clock circuit (not shown). The time division demultiplexer circuit 64 produces a red carrier signal R', which is demodulated by an amplitude demodulator 66 to produce the red color signal R, and a blue carrier signal B', which is demodulated by an amplitude demodulator 68 to produce the blue color signal B. The red color signal R and the blue color signal B are also fed to the color matrix 62, which operates as the color matrix 40 in the decoder shown in FIG. 3 to output a luminance signal Y and color difference signals I and Q.

It is also possible to obtain the green color signal by feeding the output $E_o$ of the preamp 26 to a low-pass filter which will attenuate the red-blue multiplex carrier frequency in order to eliminate these components in the composite signal $E_o$. A sample-and-hold circuit may also be employed to obtain the green color signal. The sample-and-hold signal requires a sample gate which is synchronized and phased to the scanning beam so that only the green component of the composite signal $E_o$ is sampled.

It will be appreciated that the electronics used to produce and decode the time division multiplexed electronic signal obtained from the optically color multiplexed light beam produced by the filter combination 14 presents no particular problems in design or construction, and only the sync stability of the time division demultiplexer 34 requires critical tolerance. Any problems of crosstalk and spatial frequency interference which may result from the optical arrangement in any given application may be eliminated, for example, by using an optical spatial filter adjacent to the filter combination 14. Any imperfections in the scanning by the image pickup tube at 16, such as variations in the scanning velocity or deviations by the scanning beam from straight scan lines, will appear as horizontal, i.e., time, deviations of the color square waves in the readout signal $E_o$. The same deviations will also appear in the delayed readout signal $E_1$, delayed by a period $\Delta T$ by the time delay circuit 32. Consequently, the color deviations will be essentially eliminated in the difference signal $E_2$ by the subtraction process effected by the subtractor circuit 30, resulting ultimately in virtually distortion-free red and blue color signals R and B. Therefore, the present invention employing optical color multliplexing of light from a scene to be detected and transmitted, using striped dichroic filter layers, to produce multiple electronic color signals from a single chroma carrier provides means for obtaining television transmissions of high color fidelity suitable for precision technical applications.

The foregoing disclosure and description of the invention is illustrative and explanatory thereof, and various changes in the method as well as the details of the illustrated apparatus may be made within the scope of the appended claims without departing from the spirit of the invention.

We claim:

1. A system for producing an electronic composite color signal from external light comprising:
    a. filter means, for optically transforming said external light into a light beam selectively color multiplexed perpendicular to the propagation direction of said multiplexed light beam, further comprising:
        i. first filter layer means including periodic first dichroic filter stripe means for selectively removing a first primary color from said external light, interleaved with first transparent stripe means; and
        ii. second filter layer means including periodic second dichroic filter stripe means for selectively removing a second primary color from said external light, interleaved with second transparent stripe means;

such that the combination of said first filter layer means with said second filter layer means optically multiplexes said external light in a periodic pattern in the sequence: said first color removed, said first and second colors removed, said second color removed, said first and second colors removed;
    b. scanning-type image detector means for converting said color multiplexed light beam into an electronic composite color signal time division multiplexed in said color sequence of said optical multiplexing of said external light;
    c. decoder means for converting said electronic time division multiplexed composite color signal into:
        first color signal encompassing first primary color information from said external light;
        second color signal encompassing second primary color information from said external light; and
        third color signal encompassing third primary color information from said external light; said decoder means comprising
        time delay means for obtaining a selectively delayed electronic signal from said electronic time division multiplexed composite color signal;
        subtractor means for obtaining an electronic difference signal from said electronic time division multiplexed composite color signal and said selectively delayed electronic signal;
        time division demultiplexer means for obtaining, from said electronic difference signal, said first primary color electronic signal and said second primary color electronic signal; and
        half-wave rectifier and second subtractor means for obtaining, from said electronic time division multiplexed composite color signal, said third primary color electronic signal.

2. A system for producing an electronic composite color signal from external light as defined in claim 1 wherein said scanning-type image detector means comprises an image pickup tube.

3. A system for producing color television signals comprising:
    a. filter combination means, for periodically optically color multiplexing light from a scene to be televised, further comprising:
        i. first filter layer means including parallel periodic optically transparent stripes, all of the same width, interleaved among periodic first dichroic filter stripes opaque to a first primary color, such that said first dichroic filter stripes are each three times as wide as each said optically transparent stripes of said first filter layer means; and
        ii. second filter layer means including parallel periodic optically transparent stripes interleaved among periodic second dichroic filter stripes opaque to a second primary color, such that said second dichroic filter stripes are each three times as wide as each said optically transparent stripes of said second filter layer means, and equal in width to each of said first dichroic filter stripes, to produce the multiplex sequence in the light transmitted by said filter combination as: third and second primary colors, third primary color, third and first primary colors, third primary color; and
    b. scanning television image pickup means for converting said color multiplexed light into an electronic chroma carrier signal time division multiplexed in the same color sequence as said optical color multiplexing of said light from said scene to be televised.

4. A system for producing color television signals as defined in claim 3 wherein said first primary color is blue, said second primary color is red, and said third primary color is green.

5. A system for producing color television signals as defined in claim 3 further comprising decoder means for converting said electronic chroma carrier signal into an electronic luminance signal carrying third primary color information and a pure chorminance signal time division multiplexed in first primary color information and second primary color information, and for further producing an electronic color signal carrying first primary color information and an electronic color signal carrying second primary color information.

6. A system for producing color television signals as defined in claim 5 wherein said first primary color is blue, said second primary color is red, and said third primary color is green.

* * * * *